United States Patent [19]

Neubacher

[11] Patent Number: 4,974,444

[45] Date of Patent: Dec. 4, 1990

[54] ELECTRONICALLY CONTROLLED ENGINE THROTTLE PLATE ADJUSTMENT

[75] Inventor: Timothy A. Neubacher, Garden City, Mich.

[73] Assignee: Ford Motor Company, Dearborn, Mich.

[21] Appl. No.: 375,447

[22] Filed: Jul. 5, 1989

[51] Int. Cl.$^5$ .............................................. G01M 15/00

[52] U.S. Cl. ...................................................... 73/118.1

[58] Field of Search .................. 73/117.2, 117.3, 118.1

[56] References Cited

U.S. PATENT DOCUMENTS

| | | | |
|---|---|---|---|
| 4,483,186 | 11/1984 | Parel | 73/118.1 |
| 4,601,199 | 7/1986 | Denz | 502/314 |
| 4,750,352 | 6/1988 | Kolhoff | 73/117.3 |

*Primary Examiner*—Robert Raevis
*Attorney, Agent, or Firm*—Peter Abolins; Clifford L. Sadler

[57] ABSTRACT

A method of adjusting the throttle plate of an internal combustion engine includes the use of an on-board engine control computer to control the engine while adjusting the bypass air valve. The method includes the steps of determining airflow, adjusting bypass air valve leakage based on engine idle speed requirements and applying a duty cycle to the bypass air valve.

7 Claims, 3 Drawing Sheets

ELECTRONICALLY CONTROLLED ENGINE THROTTLE PLATE ADJUSTMENT

BACKGROUND OF THE INVENTION

1. Field of the Invention

This invention related to adjusting the throttle plate on an electronically controlled engine.

2. Prior Art

An idle speed control system can include controlling airflow through a throttle and a throttle bypass airflow path. Typically, the duty cycle of an air bypass valve solenoid in the bypass air path is regulated to obtain the desired engine speed based on predicted airflow. The airflow is adaptively corrected to minimize the impact of hardware variability.

The predicted mass airflow is determined as a function of the desired engine idle speed maintained by the idle speed control system. The desired idle airflow has two components: throttle plate leakage and bypass valve airflow. An engine control strategy calculates the total desired idle airflow. The required airflow through the air bypass valve is then obtained by subtracting the throttle plate leakage term from the total idle airflow. The duty cycle output to the air bypass valve solenoid, which determines the air bypass valve position, is determined from a transfer function based on known characteristics of the air bypass valve.

Due to hardware variability, the predicted mass airflow is adjusted by an integration term, based on rpm error, and an adaptive term which was previously learned and stored in a memory of the on-board computer.

Various methods for adjusting a throttle plate to achieve a desired engine speed with zero integration error at idle are known. For example, relatively complex idle speed setting procedures include the following steps:

1. Unplug spark control line and verify that ignition timing is Base ±2 degrees before top dead center.
2. Remove positive crankcase ventilation (PCV) hose from throttle body and plug it. Remove canister purge hose from throttle body and connect it to the positive crankcase ventilation connector of the throttle body.
3. Remove positive crankcase ventilation hose at the positive crankcase ventilation valve and install .200 inch diameter orifice.
4. Disconnect idle speed control-air bypass solenoid.
5. Start engine and run at a predetermined rpm.
6. Place automatic transmission in park or drive; manual transmission in neutral.
7. Engine off, back out throttle plate stop screw clear off the throttle lever pad.
8. With a .010 inch feeler gauge between the throttle plate stop screw and the throttle lever pad, turn the screw in until contact is made then turn it an additional predetermined number of turns.
9. Check/adjust idle rpm: turn the throttle plate stop screw to a predetermined (rpm); shut engine off, and repeat Steps 5, 6, 9.
10. Shut engine off and disconnect battery for 3 minutes minimum.
11. Engine off, reconnect spark control line.
12 Remove canister purge hose from positive crankcase ventilation connector of throttle body and reconnect it to its canister purge fitting. Unplug positive crankcase ventilation hose and reconnect it to its positive crankcase ventilation fitting.
13. Remove orifice from positive crankcase ventilation hose and reconnect to positive crankcase ventilation valve.
14. Engine off; reconnect idle speed control-air bypass solenoid; verify the throttle is not stuck in the bore and linkage not preventing throttle from closing.
15. Start engine and stabilize for 2 minutes; then increase engine speed and let it return to idle; lightly depress and release the accelerator let engine idle.

Yet other ways of controlling idle speed are known.

U.S. Pat. No. 4,601,199 issued to Denz teaches a diagnostic system for determining whether an idle bypass valve is functioning properly at various engine speeds.

U.S. Pat. No. 4,483,186 issued to Parel teaches a process for adjusting a throttle plate to achieve a flow rate comparable to that attained when the carburetor was new. That is, for determining the amount of wear of the movable parts of a carburetor, the throttle of the carburetor is retained in a position where it defines a predetermined cross-sectional flow area with the hole of the induction passage. That predetermined area is the area for which, when the carburetor was new, the edge of the throttle was midway along the bypass aperture of the idling circuit. The degree of vacuum in the idling circuit of the carburetor is then compared with a reference value which is the degree of vacuum which prevails on the carburetor in brand new condition under the same operating conditions.

U.S. Pat. No. 4,750,352 issued to Kolhoff discloses a system for measuring airflow at idle taking into account flow through the throttle bore at closed throttle and flow through an idle air bypass valve. A throttle bore has a throttle for varying the effective area of the throttle bore and throttle bypass passage including a bypass valve for varying the effective area of the bypass passage. The air meter determines the airflow into the engine based upon the effective area established by the throttle and the bypass valve and where at closed throttle position the effective area of the throttle at closed position is determined based upon the airflow into the engine through the bypass passage when the engine idle speed is controlled to a predetermined idle speed.

It would be desirable to have a simplified and more predictable way of setting the idle speed control. The method should take much less time and be simple to use without much training. These are some of the problems this invention overcomes.

SUMMARY OF THE INVENTION

An electronic engine control (EEC) throttle plate adjustment test mode in accordance with an embodiment of this invention provides an automated means of determining and adjusting the throttle plate leakage to achieve the desired engine speed with zero integration error at idle. Such a diagnostic service mode uses an engine electronic control system to calculate the desired idle airflow at the requested engine speed.

This invention includes an idle speed diagnostic test procedure for adjusting a throttle plate to achieve a desired engine speed at idle. A diagnostic system uses the electronic engine control system to calculate the desired idle airflow for the requested engine speed. The airflow at a desired idle speed has a throttle plate leakage airflow component and a bypass valve airflow component. The diagnostic system uses a simple tester which produces a signal (e.g. an audible and/or visual signal) in response to engine speed and throttle position.

This invention describes a relatively simple way of establishing proper throttle plate adjustment. Such simple and sure adjustment of the throttle plate reduces warranty costs, improves driveability, and leads to greater customer satisfaction.

A diagnostic test mode in accordance with an embodiment of this invention is controlled by the engine strategy and calibrated to the specific parameters of each engine, yet provides a common approach to the idle adjustment of such a closed loop control system. Component variability due to production stackup, throttle body deposits, environmental conditions, or an aged system can relatively easily be optimized by adjusting the airflow required to give the desired engine idle speed. In practice, one tool such as a screwdriver is required to adjust the throttle position screw. Typically, an access cover must be removed to gain access to the screw. There is no need to look up specifications or follow lengthy procedures because these are built into the calibration and reside in the vehicle's on-board engine control computer. Further, special tools such as shims and orifices are not needed. Also, setting up the engine by disconnecting actuators or defaulting systems is not necessary.

The invention provides a simple idle adjustment procedure for a closed loop idle control system applicable to a variety of engines. Servicability is improved by eliminating numerous specification, setup procedures, and special service tools. The end result is not only to adjust the throttle plate, but to prevent throttle plate maladjustment.

An idle speed control system in accordance with an embodiment of this can offer the following advantages:

(1) Variability factor eliminated—Physical adjustment of the throttle plate optimizes idle speed control function of the bypass air valve thus adaptive corrections minimized.

(2) Previously learned adaptive memory is cleared during test procedure to establish zero baseline.

(3) Process is common to all engine families—Individual specifications, once unique, become transparent as they are built into the calibration.

(4) Improved serviceability/accuracy—Procedure is contained in the vehicles on-board computer and requires engine controls validation prior to service mode. Eliminates tampering/defaulting control system, special tools, and equipment error (tachometer).

(5) Fuel and spark control systems are used as a means to optimize the desired idle speed. There is no need to disable these systems or the idle speed control system.

(6) Automates current idle adjustment procedures —Eliminates matrix method of individual procedures.

(7) Predictable/repeatable/reliable—Interactive with idle speed control strategy and engine calibration. System-to-system variables are not perceived by the customer and field service.

DETAILED DESCRIPTION OF THE INVENTION

Figure 1:
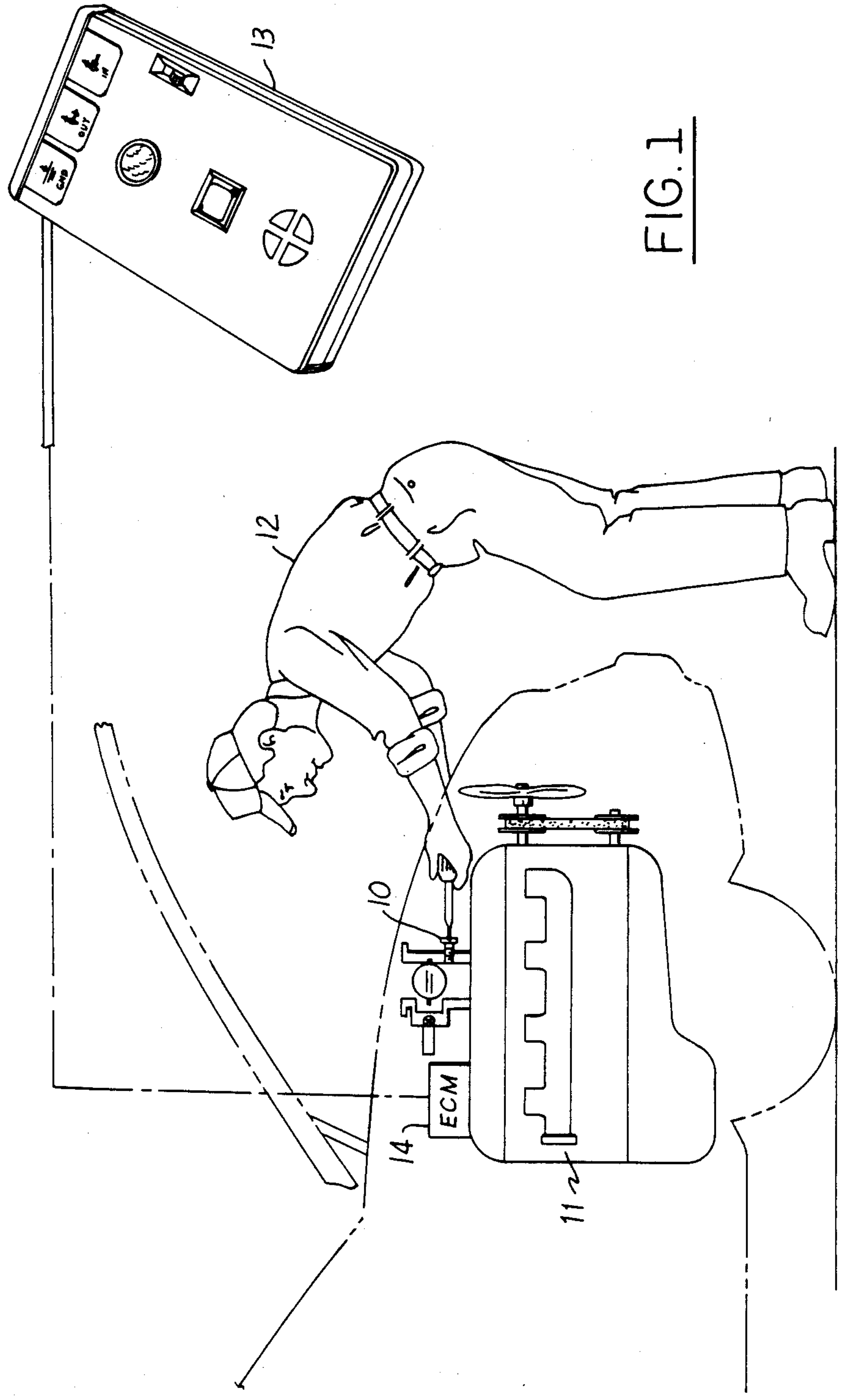
FIG. 1 is a block diagram of a throttle plate adjustment system in accordance with an embodiment of this invention.

Referring to FIG. 1, throttle plate adjustment in accordance with an embodiment of this invention includes adjusting a throttle plate adjusting screw 10 on an engine 11 by a technician 12. Technician 12 responds to sounds emitted by a tester 13 which is coupled to an electronic engine control module 14 controlling engine 11. Various sensors (e.g. throttle position sensor) in engine 11 couple information characterizing engine operation to engine control module 14. After tester 13 initiates a test mode in engine control module 14, engine control module 14 sends information relating to engine speed and throttle plate position to tester 13. In response to the information received from module 14, tester 13 generates either a light or an audio signal for technician 12.

Figure 2:
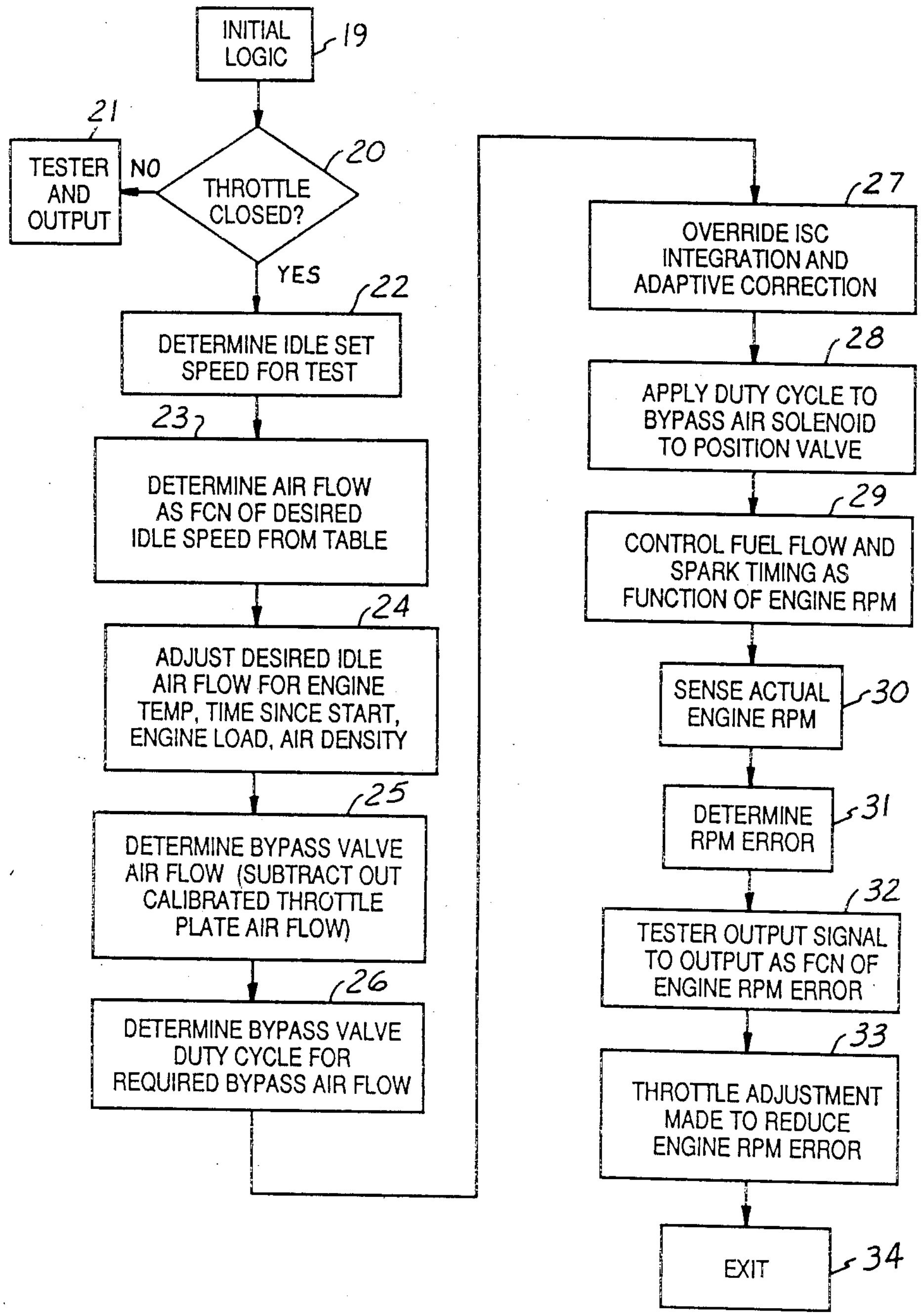
FIG. 2 is a logic flow diagram of a throttle adjustment procedure in accordance with an embodiment of this invention.

Referring to FIG. 2, a method for determining throttle plate adjustment begins at an initial logic block 19. Decision block 20 asks whether or not the throttle is closed. If the throttle is not closed, logic flow goes to a block 21 wherein an output is produced for tester 13 (FIG. 1) to indicate that throttle adjustment cannot take place. If the throttle is closed, logic flow goes to a block 22 wherein there is a determination of desired idle speed for the test mode.

After the desired idle speed is determined at block 22, logic flow goes to a block 23 wherein desired idle airflow is determined as a function of desired idle speed from a table. Logic flow then goes to a block 24 wherein desired idle airflow is adjusted as a function of engine temperature, time since start, engine load and air density.

After the adjustment of desired idle airflow is made at block 24, logic flow goes to a series of blocks 25, 26, 27 and 28. This sequence is designed to generate a certain amount of airflow through the bypass path. Logic flow goes to a block 25 wherein bypass valve airflow is determined by subtracting out a calibrated throttle plate airflow i.e. a predetermined or first throttle plate leakage calibration parameter, from the airflow determined in block 24 (i.e the airflow determined in block 23 as compensated in block 24). After the bypass valve airflow is determined at block 25, logic flow goes to a block 26 wherein the bypass valve duty cycle required for such a bypass airflow is determined. Logic flow then goes to a block 27 wherein the idle speed control integration and adaptive correction are overridden to establish baseline values of bypass value airflow (duty cycle). Logic flow then goes to a block 28 wherein the duty cycle determined in block 26 is applied to the bypass air solenoid to position the bypass air valve to provide such an airflow.

Other engine parameters being controlled during the throttle adjustment are engine fuel flow and spark timing. From block 28, logic flow also goes to a block 29 which generates a fuel flow and spark timing as a function of engine rpm.

Logic flow then goes to a block 30 which provides a sensed actual engine rpm. The output of block 30 is applied to a block 31 wherein rpm error as determined from the idle speed determined in block 22, and equal to desired rpm minus actual rpm, is determined. Logic flow from block 31 goes to block 32 wherein a tester generates a signal based on the output as a function of engine rpm error. From block 32 logic flow goes to a block 33 wherein the throttle adjustment is made to reduce engine rpm error. Logic flow proceeds to block 34 to exit this calculation sequence This calculation sequence can be reentered at block 19.

Figure 4:
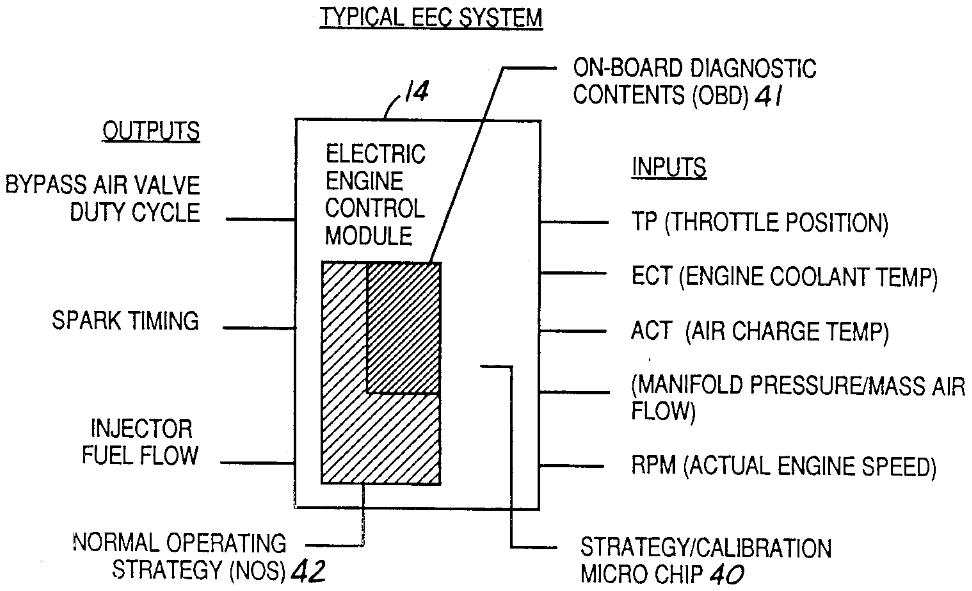
FIG. 4 is a block diagram of an electronic engine control system.

Referring to FIG. 4, electronic engine control module 14 is shown in greater detail. In particular, module 14 includes a strategy calibration microchip 40 which has a portion 41 for on-board diagnostic contents and a portion 42 for normal operating strategy. Typical inputs for module 14 include throttle position (TP), engine coolant temperature (ECT), air charge temperature (ACT), manifold absolute pressure (MAP) or mass airflow (MAF), and actual engine speed (RPM). Outputs from module 14 include a bypass air value duty cycle, spark timing and fuel flow.

Figure 3:
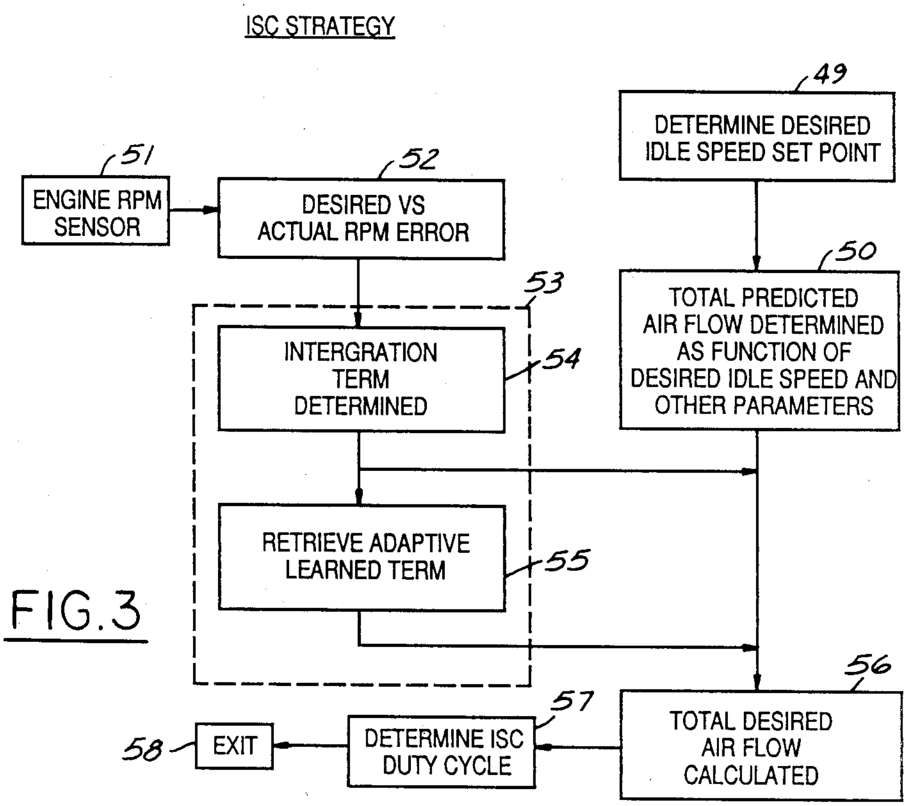
FIG. 3 is a logic flow diagram of an engine idle speed control system compatible with an embodiment of this invention.

Referring to FIG. 3, a portion of the normal operating strategy of section 42 of FIG. 4 is shown in more detail. At block 49, the desired idle speed set point is determined and applied to a block 50. A total predicted airflow is determined as a function of desired idle speed at block 50. At block 51 an engine rpm sensor provides an input to block 52 wherein desired versus actual rpm error is determined, wherein this rpm calculation to determine the rpm error is equaled to the desired rpm minus the actual rpm. RPM error is employed in a correction section 53 which a block 54 which provides an instantaneous integration term and a block 55 which provides an adaptive learned term which is an updated history of the airflow error. Logic flow from the instantaneous correction factor of block 54 goes to the updated history factor of block 55. Outputs from both block 54 and 55 are combined with the output of block 50, the total predicted airflow as a function of engine idle speed and applied to a block 56 wherein total desired airflow is calculated Correction factors associated with blocks 54 and 55 are ignored during the diagnostic test as is shown in block 27 of FIG. 2. The adjustment of the throttle plate within the dial test brings these factors near zero when used as part of the normal engine control strategy. They typically have values which are used to make corrections to the airflow during normal feedback control. Logic flow from block 56 goes to a block 57, wherein the idle speed control duty cycle is determined and then to a block 58 wherein this sequence is exited.

In accordance with an embodiment of this invention an on-board diagnostic test mode is used to determine engine idle requirements. During idle adjustment, the test mode provides audible and/or visual feedback signals as a function of engine speed and throttle position. The throttle plate is physically adjusted to set a desired engine speed thereby compensating for, among other things, throttle plate leakage.

In the idle speed control system, the total engine airflow, required to maintain desired engine speed, is comprised of two components: the throttle plate . leakage and bypass valve or orifice leakage. If the actual throttle plate leakage is not representative of the calibrated leakage term then, in order to achieve the desired engine speed, the bypass valve airflow is adjusted via an integration component. This integration component is slowly rolled into keep-alive memory.

The bypass valve airflow control mechanism is a duty cycle output applied to a solenoid controlling the air bypass valve. The duty cycle output is calculated based on known characteristics of the air bypass valve. The airflow required through the bypass valve is the difference of the total airflow required and the throttle plate leakage term.

Advantageously, in an engine control strategy, the throttle adjustment mode can only be entered during specified conditions after an on-demand test. This ensures that: (1) the electronic engine control system is verified to have no faults; (2) there has been a warm-up period; (3) time is allowed to check ignition timing prior to throttle adjustment.

For example, to enter the mode the Tester Input is ungrounded and again grounded within a 4 second lapsed time period. The Tester Input was initially grounded to enter the on-demand test. A signal is output on Tester Output as an indicator of mode entry.

Once entered, the strategy determines the desired airflow and other idle conditions for the requested engine speed. The air bypass valve duty cycle needed at the desired airflow is calculated and output during the entire mode. Error integration and adaptive learned adders are disabled. The correct throttle plate leakage is then achieved by turning the throttle adjustment screw until the Tester Output signal remains on constantly. This indicates that the engine speed is within the calibrated tolerance. Otherwise, the alternative signals are: a 4Hz output when the engine speed to high, a 1Hz output when the engine speed is to low, and a 8Hz output when the throttle position sensor is out of the design range for closed throttle position.

Strategy functional modifications include; unique entry/exit logic which can access this mode only as necessary and exit by manual means or automatic means, disable idle speed error integration and clear idle speed adaptive learning, modulate fuel in closed loop control for engine stability, disable feedback spark control, use altitude correction, provides continuous feedback of engine speed and throttle position via audible and/or visual means by an output accessed from the on-board computer through existing testers.

Once the throttle plate adjustment mode is entered, the preset engine conditions are allowed to stabilize for a calibrated period of time. To signal that this time has elapsed and throttle adjustment may proceed, a pulse is output on the Tester Output.

The Tester Output is also used as feedback to the operator during the adjust mode. If the idle speed is within the range, the Tester Output will be ON constantly, otherwise it will FLASH at a rate of 1 Hz when below the range or at a rate of 4 Hz when above the range. If at anytime during this mode the TP sensor goes out of range, the Tester Output will flash at a rate of 8 Hz. The Adjustment Mode ends when a calibrated time period, typically 10 minutes, is reached.

Various modifications and variations will no doubt occur to those skilled in the arts to which this invention pertains. For example, the particular coding may be varied from that described herein. These and all other variations which basically rely on the teachings through which this disclosure has advanced the art are properly considered within the scope of this invention.

I claim:

1. A method of controlling the throttle adjustment of the throttle plate of an internal combustion engine including the steps of:

determining if the throttle plate is closed;

determining the calibrated desired engine idle speed;

determining the required airflow at the desired idle speed;

adjusting the required airflow for engine temperature, time and load;

sensing the actual engine rpm;

determining an engine rpm error by comparing the desired and the actual engine rpm;

generating a control output as a function of rpm; and adjusting the throttle as a function of the generated control output.

2. A method as recited in claim 1 further comprising the step of controlling spark timing.

3. A method as recited in claim 2 further comprising the step of controlling fuel flow.

4. A method as recited in claim 3 further comprising the step of adjusting the airflow in the bypass path using a bypass valve actuated by a bypass solenoid.

5. A method as recited in claim 4 wherein the step of adjusting the airflow in the bypass path includes the steps:

determining airflow as a function of desired idle speed from a table;

determining bypass valve airflow by subtracting out calibrated throttle plate airflow and establishing total airflow equal to throttle plate leakage plus bypass valve airflow and, therefore, bypass valve airflow equal to total airflow minus throttle plate leakage airflow;

determining the bypass valve duty cycle to achieve the required bypass airflow; and applying the duty cycle to the bypass air solenoid to position the bypass valve.

6. A method of adjusting the throttle plate of an internal combustion engine including the use of an on-board engine control computer to control the engine while manually adjusting the throttle valve, and including the steps of determining airflow; adjusting bypass air valve leakage based on engine idle speed requirements and applying a duty cycle to the bypass air valve, said method including the steps of:

determining if the throttle plate is closed;

determining the calibrated desired engine idle speed;

determining the required airflow at the desired idle speed;

adjusting the required airflow for engine temperature, time and load;

sensing the actual engine rpm;

determining an engine rpm error by comparing the desired and the actual engine rpm;

generating a control output as a function of rpm;

adjusting the throttle as a function of the generated control output;

controlling spark timing;

adjusting the airflow in the bypass path;

wherein the step of adjusting the airflow in the bypass path includes the steps;

determining airflow as a function of desired idle speed from the table;

determining bypass valve airflow by subtracting out calibrated throttle plate airflow and establishing total airflow equal to throttle plate leakage plus bypass valve airflow and, therefore, bypass valve airflow equal to total airflow minus throttle plate leakage airflow;

7. A closed loop throttle adjustment system for an internal combustion engine having an intake manifold, an induction passage opening from the atmosphere to the intake manifold and including a throttle bore and a variable position throttle in the throttle bore for varying the effective area of the induction passage to regulate the airflow into the intake manifold and further including a throttle bypass passage opening, including a closed throttle position for establishing one airflow, from the atmosphere to the intake manifold and including a variable position valve for varying the effective area of the bypass passage to regulate the airflow into the intake manifold bypassing the throttle, and airflow adjustment means including in combination:

means for controlling the position of the valve in the bypass passage to control the engine idle speed to a predetermined value during an idle speed operating mode of the engine, the total airflow intot he intake manifold at the desired engine idle speed having a predetermined value so that the airflow through the throttle bore is equal to the predetermined value less the airflow through the bypass passage;

means for storing the position of the variable position valve when the engine is at the predetermined idle speed value during the engine idle speed operating mode, this stored value representing the airflow value through the bypass passage and therefore the flow value and effective area of the induction passage opening defined by the closed throttle position;

means for storing a schedule of values of the effective area of the induction passage opening defined by the closed throttle as a function of the position of the variable position valve when the engine is at the predetermined idle speed;

means for storing a schedule of values of the effective area of the bypass passage defined by the position of the variable position valve;

means for determining the value of the barometric pressure; and means for measuring the value of the manifold air temperature.

* * * * *